United States Patent
Botticelli

(10) Patent No.: US 10,652,335 B2
(45) Date of Patent: May 12, 2020

(54) DYNAMICALLY PRESENTING VEHICLE SENSOR DATA VIA MOBILE GATEWAY PROXIMITY NETWORK

(71) Applicant: Trimble Inc., Sunnyvale, CA (US)

(72) Inventor: Mark Philip Botticelli, North Grafton, MA (US)

(73) Assignee: Trimble Inc., Sunnyvale, CA (US)

( * ) Notice: Subject to any disclaimer, the term of this patent is extended or adjusted under 35 U.S.C. 154(b) by 728 days.

(21) Appl. No.: 14/828,581

(22) Filed: Aug. 18, 2015

(65) Prior Publication Data

US 2016/0050265 A1   Feb. 18, 2016

Related U.S. Application Data

(60) Provisional application No. 62/038,611, filed on Aug. 18, 2014.

(51) Int. Cl.
*H04L 29/08* (2006.01)
*H04W 84/18* (2009.01)

(52) U.S. Cl.
CPC .......... *H04L 67/125* (2013.01); *H04L 67/025* (2013.01); *H04L 67/26* (2013.01); *H04L 67/36* (2013.01); *H04W 84/18* (2013.01)

(58) Field of Classification Search
CPC ......... H04L 29/00; H04L 29/02; H04L 29/06; H04L 29/0602; H04L 29/06027; H04L 29/06047; H04L 29/06095–0617; H04L 29/060183; H04L 29/06387; H04L 29/08; H04L 29/08081; H04L 29/0809; H04L 29/08099; H04L 29/08117; H04L 29/08558; H04L 29/08576; H04L 29/08567; H04L 29/08594; H04L 41/00; H04L 41/08–0806; H04L 41/22; H04L 51/00; H04L 51/06–066; H04L 65/00–1003; H04L 65/1013; H04L 65/102; H04L 65/1059; H04L 65/1063–1073; H04L 65/40;
(Continued)

(56) References Cited

U.S. PATENT DOCUMENTS 5,400,246 A * 3/1995 Wilson ................... G06F 3/023
340/12.53
5,519,410 A * 5/1996 Smalanskas ........... B60K 35/00
340/980

(Continued)

FOREIGN PATENT DOCUMENTS

WO   WO2009079036   6/2009
WO   WO2013072925   5/2013

OTHER PUBLICATIONS

Bosch—CAN Specification 2.0—GmbH—1991.*

*Primary Examiner* — Tauqir Hussain
*Assistant Examiner* — Boris D Grijalva Lobos
(74) *Attorney, Agent, or Firm* — Kilpatrick Townsend & Stockton LLP

(57) ABSTRACT

A new sensor is detected being added to a vehicle sensor bus. A publication topic is created based on the new sensor. The publication topic is made available via at least a server component operating via the proximity networking radio. Data from the new sensor is added to the publication topic. In response to a subscription to the publication topic via a user device, the data is dynamically presented to the user device via the server component.

20 Claims, 6 Drawing Sheets

(58) Field of Classification Search
CPC ......... H04L 65/4007; H04L 67/00–025; H04L 67/06; H04L 67/12; H04L 67/18; H04L 67/42; H04L 67/26; H04L 67/36; H04L 67/125

See application file for complete search history.

(56) References Cited

U.S. PATENT DOCUMENTS

| | | | | |
|---|---|---|---|---|
| 7,117,075 B1* | 10/2006 | Larschan | | G06Q 10/06 701/29.6 |
| 7,455,225 B1* | 11/2008 | Hadfield | | G07C 5/085 235/384 |
| 7,904,219 B1* | 3/2011 | Lowrey | | G01C 21/26 701/32.3 |
| 8,615,374 B1* | 12/2013 | Discenzo | | G06F 15/00 219/497 |
| 8,670,897 B1* | 3/2014 | Ralson | | G06F 11/3013 701/36 |
| 9,147,335 B2* | 9/2015 | Raghunathan | | G08B 23/00 |
| 9,311,763 B2* | 4/2016 | Gompert | | G07C 5/008 |
| 9,448,547 B2* | 9/2016 | Messenger | | G05B 15/02 |
| 9,779,183 B2* | 10/2017 | Gallo | | G06F 17/30997 |
| 9,849,999 B1* | 12/2017 | Fymat | | B64D 45/00 |
| 10,056,008 B1* | 8/2018 | Sweany | | G09B 19/167 |
| 10,102,495 B1* | 10/2018 | Zhang | | G06Q 10/0838 |
| 2002/0188425 A1* | 12/2002 | Nakagawa | | G07C 5/085 701/29.4 |
| 2003/0093187 A1* | 5/2003 | Walker | | B64C 13/20 701/1 |
| 2003/0144868 A1* | 7/2003 | MacIntyre | | G06F 17/30536 705/7.38 |
| 2004/0194129 A1* | 9/2004 | Carlbom | | H04N 7/181 725/32 |
| 2004/0215379 A1* | 10/2004 | Pangerl | | G01L 3/26 701/31.4 |
| 2006/0267731 A1* | 11/2006 | Chen | | G06Q 10/08 340/10.1 |
| 2007/0046448 A1* | 3/2007 | Smitherman | | G01C 11/02 340/431 |
| 2007/0055442 A1* | 3/2007 | Kawakami | | B60K 35/00 701/436 |
| 2007/0149184 A1* | 6/2007 | Viegers | | G06Q 10/06 455/422.1 |
| 2007/0265866 A1 | 11/2007 | Fehling et al. | | |
| 2008/0027591 A1 | 1/2008 | Lenser et al. | | |
| 2009/0216775 A1* | 8/2009 | Ratliff | | H04W 4/029 |
| 2009/0259361 A1* | 10/2009 | Tuff | | G01P 1/07 701/31.4 |
| 2010/0127847 A1* | 5/2010 | Evans | | G06F 3/04817 340/461 |
| 2010/0303068 A1* | 12/2010 | Glaros | | H04L 12/4633 370/389 |
| 2011/0046845 A1* | 2/2011 | Kozlay | | G06Q 10/06 701/31.4 |
| 2011/0190952 A1* | 8/2011 | Goldstein | | H02J 3/32 700/291 |
| 2011/0281522 A1* | 11/2011 | Suda | | G06Q 10/0833 455/41.2 |
| 2012/0028680 A1* | 2/2012 | Breed | | B60C 11/24 455/556.1 |
| 2012/0149353 A1 | 6/2012 | Helfrich | | |
| 2012/0194679 A1* | 8/2012 | Nehowig | | G06F 1/1626 348/148 |
| 2013/0151032 A1* | 6/2013 | Kraeling | | H04L 45/74 701/1 |
| 2013/0169410 A1* | 7/2013 | Amselem | | G05B 1/01 340/5.52 |
| 2013/0282201 A1* | 10/2013 | Kolodgie | | G08G 1/20 701/2 |
| 2013/0311035 A1* | 11/2013 | Czyz | | B60Q 1/0023 701/36 |
| 2014/0032062 A1* | 1/2014 | Baer | | G07C 5/08 701/51 |
| 2014/0152422 A1* | 6/2014 | Breed | | G06K 9/00369 340/5.52 |
| 2014/0185516 A1 | 7/2014 | Rubin et al. | | |
| 2015/0120178 A1* | 4/2015 | Kleve | | G01C 21/34 701/408 |
| 2015/0135087 A1* | 5/2015 | Verkasalo | | H04L 67/125 715/745 |
| 2015/0241993 A1* | 8/2015 | Gallo | | H04L 67/22 345/156 |
| 2015/0338447 A1* | 11/2015 | Gallo | | G01D 1/18 340/600 |
| 2016/0034158 A1* | 2/2016 | Livesay | | G05B 19/41835 715/736 |
| 2016/0034329 A1* | 2/2016 | Larson | | G01D 21/02 702/188 |
| 2016/0041386 A1* | 2/2016 | Rodriguez Moreno | | G02B 27/0101 345/7 |
| 2016/0047718 A1* | 2/2016 | Uratani | | G01M 15/102 73/114.71 |
| 2016/0048515 A1* | 2/2016 | Mullins | | G06F 17/3087 707/737 |
| 2016/0117162 A1* | 4/2016 | Searle | | H04L 41/082 717/173 |

\* cited by examiner

DYNAMICALLY PRESENTING VEHICLE SENSOR DATA VIA MOBILE GATEWAY PROXIMITY NETWORK

RELATED APPLICATIONS

This application claims the benefit of Provisional Patent Application No. 62/038,611, filed on Aug. 18, 2014, to which priority is claimed pursuant to 35 U.S.C. § 119(e) and which is incorporated herein by reference in its entirety.

SUMMARY

The present disclosure is related to vehicle data systems. In one embodiment, method, systems, apparatuses, and a computer-readable medium facilitate detecting a new sensor added to a vehicle sensor bus. A publication topic is created based on the new sensor. The publication topic is made available via at least a server component operating via the proximity networking radio. Data from the new sensor is added to the publication topic. In response to a subscription to the publication topic via a user device, the data is dynamically presented to the user device via the server component.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

In general, the disclosure is directed to techniques for utilizing vehicle data. Such data, which may include any data generated by onboard sensors, may be used to manage operation of private or commercial vehicles. In some systems, motor vehicles are equipped with communication devices that communicate data to a data center or other central office system. While the vehicles and/or drivers need not have any association with one another, the vehicles may be part of one or more fleets of vehicles, such as in the trucking industry. The central office may serve as a fleet management system (FMS) in which the trucks or other vehicles communicate, regardless of which fleet, if any, they may be associated with.

The solutions presented herein utilize the data gathered by vehicle sensor systems to provide information to the driver and other occupants of the vehicle. While some systems currently provide this ability, the systems are often specially built for particular purposes. For example, some in-vehicle fleet management systems provide in-cab display and controller units that interface with a particular controller/gateway unit that gathers the data. While these in-cab units can be built to a given specification, the cost can be significant. Further, such devices may need reconfiguration (e.g., new firmware) to handle new functionality provided by the controller/gateway unit and/or new sensors.

In embodiments described herein, a mobile gateway unit provides a wireless access point (e.g., Wi-Fi hotspot) and a server that provides sensor and other data via a network server. This server runs locally on the vehicle, and may utilize a known data access protocol, such as Hypertext Transport Protocol (HTTP). In this way, a commodity user device such as smartphone or tablet can be used to access the vehicle data and other fleet management-type data. This can reduce costs and leverage the development and improvements in general-purpose consumer and/or commercial mobile devices. For example, features such as voice recognition, biometric authentication, multiple applications and protocol compatibility, are available "out-of-the-box" with modern mobile devices, and these features can be useful for in-cab applications.

Figure 1:
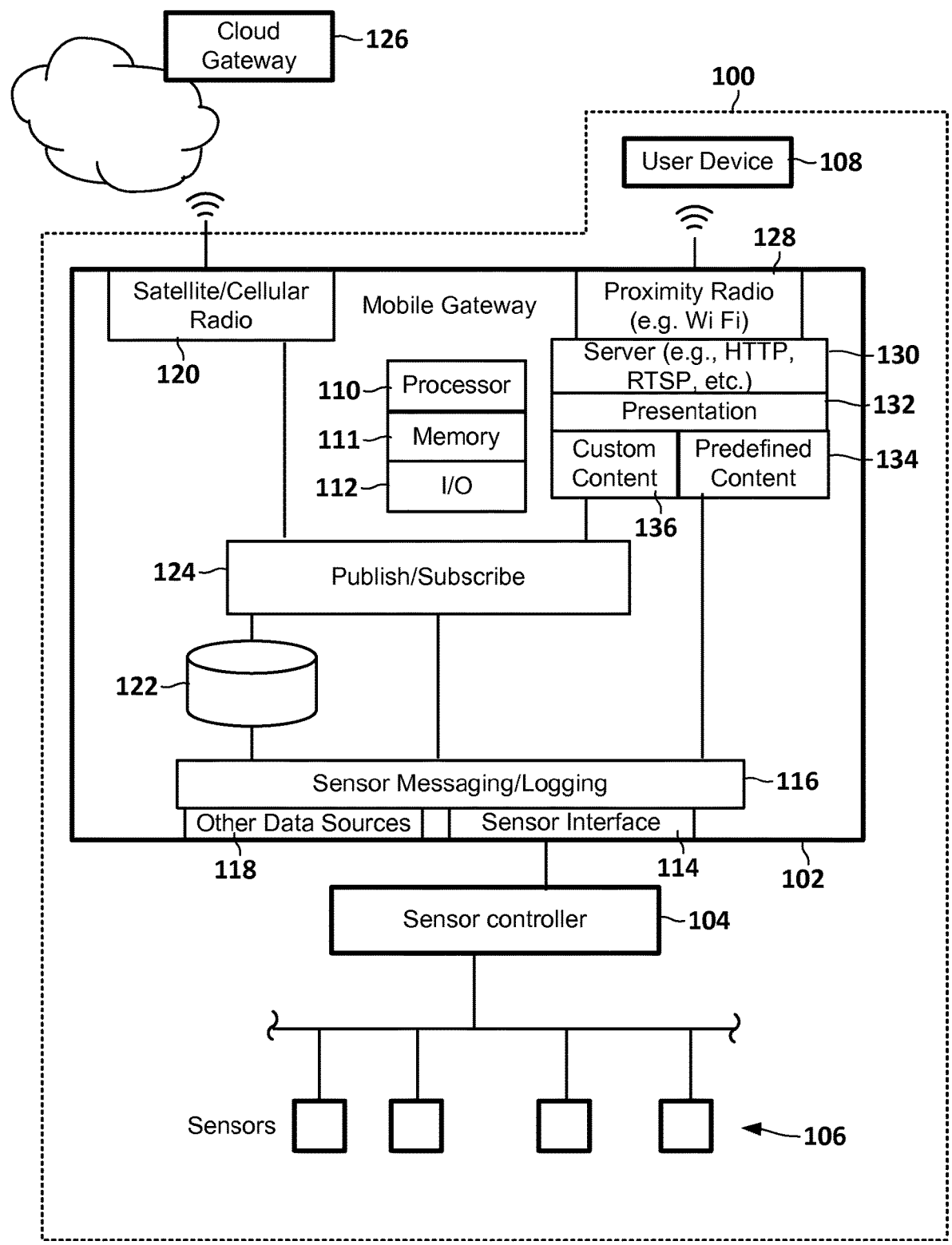
FIG. 1 is a block diagram of an in-vehicle system according to an example embodiment.

In reference now to FIG. 1, a block diagram illustrates an in-vehicle system according to an example embodiment. The confines of a vehicle are generally indicated by dashed line 100, which encompasses a mobile gateway 102, a sensor controller 104, sensors 106, and a user device 108. The mobile gateway 102 serves generally as a data collection and disbursement device, and may include special- or general-purpose computing hardware, as indicated by processor 110, memory 111, and input/output (I/O) circuitry 112. The mobile gateway 102 also includes a sensor interface 114 that may be coupled to external data gathering components such as sensor controller 104. The sensor interface 114 may include data transfer interfaces such as serial port (e.g., RS-232, RS-422, etc.), Ethernet, Universal Serial Bus (USB), etc.

The sensor controller 104 in this example may be configured to read data from vehicle type busses, such as Controller Area Network (CAN). Generally, CAN is a message-based protocol that couples nodes to a common data bus. The nodes utilize bit-wise arbitration to determine which node has priority to transmit onto the bus. The leading bits of the message determine which messages will win arbitration, and so relative ranking of message priorities is set by assigning message IDs that populate these leading bits. The embodiments need not be limited to CAN busses; the sensor controller 104 (or other sensor controllers) can be used to read data from other types sensor coupling standards, such as power-line communication, IP networking (e.g., Universal Plug and Play), I$^2$C bus, Serial Peripheral Interface (SPI) bus, vehicle computer interface, etc. While the sensor controller 104 is shown as external to the mobile gateway 102, it may be incorporated within the mobile gateway 102, e.g., integrated with main board and/or as an expansion board/module.

The sensor controller 104 may act as a pass-through that detects and assembles messages, and queues them for transmission to the sensor interface 114. The sensor controller 104 may include additional capabilities such as determining a type of data encoded in the message, formatting the message data, and adding additional data (e.g., metadata, tags) that facilitate easily interpreting the message data. The sensor controller 104 may also have the ability to detect sensors being added or removed from the existing set of sensors 106. This can dynamically affect the types and amounts of data being transferred to the mobile gateway 102 via the sensor interface 114.

The mobile gateway 102 includes a sensor/messaging logging component 116 that receives sensor data via the sensor interface 114. The messaging logging component 116 processes various streams of data from the sensor interface 114 (which may include multiple interfaces) and other data sources 118. The other data sources 118 may include data generated/measured by the mobile gateway 102 itself, and the user device 108, and wireless networks, as indicated by satellite/cellular radio module 120. The messaging/logging component 116 at least classifies the messages and stores the message data in a persistent data store 122. The data store 122 may include a hard drive or flash memory, and the messaging/logging component 116 may process the messages (e.g., compression, discarding of old data) to ensure the data store 122 doesn't become full.

The messaging/logging component 116 may attempt to categorize the data received via the sources and store it appropriately in the data store 122. For example, the data store 122 may include a relational database that stores numeric or text data, and one table of the database may have columns such as TIMESTAMP, DATA_TYPE and DATA, where DATA_TYPE is an enumerated type (e.g., temperature, geolocation, percentage, etc.). However, the DATA_TYPE column may be redundant for large data sets, and instead a different table may be formed for each type of data. Other types of data, such as images, audio, video, may use other storage conventions.

Generally, the messaging/logging component 116 may only need to interpret the incoming data so that it can be efficiently stored, and other components, such as the publish/subscribe component 124, may perform additional interpretations/transformations and/or create more sophisticated representations and categorizations of the data. An example of the former is converting temperature readings from a variety of sensors to a common format, e.g., degrees C. An example of the latter is using sensors that detect fuel flow and speed to derive fuel consumption, both instantaneous consumption and a running average. The running average fuel consumption can be combined with a fuel level sensor to derive a range in miles until fuel is empty. These derived values can also be stored in the data store 122 and/or dynamically calculated as needed.

Besides categorizing data, the publish/subscribe component 124 implements a pattern that is useful for providing customized views of data. In a publish/subscribe model, publishers of messages do not program the messages to be sent directly to subscribers. Instead, published messages are characterized into topics (or named logical channels), without knowledge of what, if any, subscribers there may be. Similarly, subscribers express interest in one or more topics, and only receive messages that are of interest, without knowledge of what, if any, publishers there are.

In the present example, the publish/subscribe component 124 categorizes the vehicle data into appropriate topics, such as telemetry data (e.g., geolocation, speed, altitude, direction.), engine data (e.g., coolant temperature, generator voltage, airflow, engine speed), cargo data (e.g., temperature, vibration), etc. The list of topics may expand or contract based on sensors detected via the sensor controller 104. For example, if a rear-view camera is added, the feed (either static images or video) can be added to one or more topics, such as telemetry data, and/or have its own topic created, e.g., "on-board video." Subscribers in a topic-based system may receive some or all messages published to the topics to which they subscribe, and all subscribers to a topic may receive the same messages. Customizations may be used (e.g., filters) that allow blocking certain messages on a particular topic. The publisher defines the classes of messages to which subscribers can subscribe, and associate those messages with the various topics as appropriate. Thereafter, a mechanism such as HTTP, syndication feed, email, etc., may be used to send out the messages. This results in dynamic presentation of the sensor data, e.g., a time varying view of data that may be in real-time or near-real time.

The publish/subscribe component 124 may be part of a wider publish/subscribe system of a fleet management system. For example, a cloud gateway 126 is an infrastructure service that subscribes to a set of messages from the mobile gateway 102. These messages are stored and may be further processed by the cloud gateway. Other subscribers such as fleet management services, customers, and third parties, and subscribe to the messages via a publish/subscribe service of the cloud gateway 126. The cloud gateway 126 may aggregate similar messages from a large number of vehicles, providing an overall picture of fleet activity, for example.

The publish/subscribe component 124 of the individual mobile gateways 102 assists in easily implementing features of the cloud gateway 126. For example, the publish/subscribe component 124, either automatically or with minimal configuration, can handle new types of sensor data (or new transformations and combinations of existing sensor data) by adding a new topic. The cloud gateway 126 can add this to its subscription from the mobile gateway 126 using well-establish subscription protocols, and similarly publish the information to other entities.

As noted above, the user device 108 may be able to provide user data as inputs to the sensor messaging/logging component 116. In particular, the user device 108 may have applications installed that include publish/subscribe functionality similar to the mobile gateway 102. For example, the user device 108 may be able to authenticate the driver and thereby assign the driver's identity to the vehicle. The user device 108 may include a log book application for recording hours of driving and resting. This data may be able to be published to the mobile gateway 102 and accessed elsewhere, e.g., to ensure the driver is compliant with regulations. In another case, the user device 108 may use a camera of the user device 108 to record cargo identifiers (e.g., barcodes), take pictures of the loaded cargo (e.g., for insurance purposes), and perform other actions related to the transport of cargo. This information can also be useful to fleet managers and others. Similarly, other applications such as vehicle maintenance records/requests, checklists, bill of lading, etc., can gather data that is useful both to the driver and to FMS services.

Besides providing data sources, the publish/subscribe model also allows for flexible and extendable views of the data to vehicle occupants via the user device 108. The mobile gateway 102 includes a readily-available proximity radio 128 that may use standards such as Wi-Fi™ or Bluetooth™. The proximity radio 128 may provide general-purpose Internet access to the user device 108, e.g., by routing data packets via the wireless network used to communicate with the cloud gateway 126. A server component 130 provides local content (e.g., content produced within the mobile gateway 102) to the user device 108 over the proximity radio 128 via well-known protocols, such as HTTP, HTTPS, Real-Time Streaming Protocol (RTSP), File Transfer Protocol (FTP), Simple Mail Transfer Protocol (SMTP), etc. A commercially available application such as a browser or media player running on the user device 108 can utilize the services of the server component 130 without any customization of the user device 108.

The service component 130 may also be used without a high-level of customization. For example, if the service component 130 provides HTTP/HTTPS services, a widely available server such as Apache can be used. Such a server can be made secure and is frequently updated with fixes and features. The service component 130 can take advantage of a special-purpose presentation component 132 that provides functionality tailored for presenting data from the mobile gateway 102 to the user device 108. The presentation component 132 may utilize existing application technologies that extend the functionality of the server component 130. For example, technologies such as Common Gateway Interface (CGI), Java™ Enterprise Edition and Active Server Pages (ASP) allow dynamically generated content to be provided via HTTP and utilized in browsers.

The presentation component 132 provides services generally of interest to the occupants of the vehicle 100, which may include driver and/or passengers. Data such as engine status (e.g., temperature, speed, miles traveled) are already commonly including in instrument panels viewable by the driver. Other data, such as video from aftermarket cameras, can be viewed using customized displays. Other data may be provided from a fleet manager, such as messaging (e.g., dispatch, company notices, alerts), etc. Because the needs of fleets and other commercial entities may be highly-specialized, additional data may be useful to the occupant, and this kind of flexibility can be provided via the presentation component 132.

Generally, the presentation component 132 provides a framework for visualizing data for presentation via the server component 130, as well as managing possibly changing data sources detected via the mobile gateway 102, such as via the sensor messaging/logging component 116. The available data sources are generally divided for purposes of discussion into predefined content 134 and custom content 136. The predefined content 134 may include content that is commonly available on vehicles, such as engine data, speed, direction, location, etc. The predefined content 134 may be made available using relatively static templates, such that the server can present useful default content without significant effort on behalf of the user.

The custom content 136 facilities using content that is user specific, and may be defined by the user and/or fleet management systems after the system has been fielded. For example, if a type of sensor not normally associated with fleet management, e.g., a pH sensor, is coupled to the sensor controller 104, the sensor controller 104 may be able to read the messages from the sensor which can be sent to the sensor messaging/logging component 116. Even if the sensor messaging/logging component 116 or sensor controller 104 have not dealt with this type of sensor, they may be able to determine from a local or remote database that this sensor is TYPE_PH, and can create a database table (or other structure) for storing the sensor data in the data store. Or, of the type cannot be determined, a generic type may be used, e.g., TYPE_UNKNOWN_1. The sensor messaging/logging component 116 may convert the data to a recognizable format (e.g., floating point number or string) or store the binary representation as read by the sensor.

The publish/subscribe component 124 can be configured to automatically detect new sensor tables added to the data store, and can create a new topic, e.g., pH sensor or unknown sensor 1, which is published and available for subscription, either locally or remotely. In this case, the fleet management system and/or operator would already understand the reasons and uses for the pH sensor, and can subscribe to the new topic as part of creating the custom content 136. Another aspect of the custom content 136 is the ability to create new user interfaces, and the fleet management system and/or operator can further define user interface elements that provide the desired presentation of the pH data.

Figure 2:
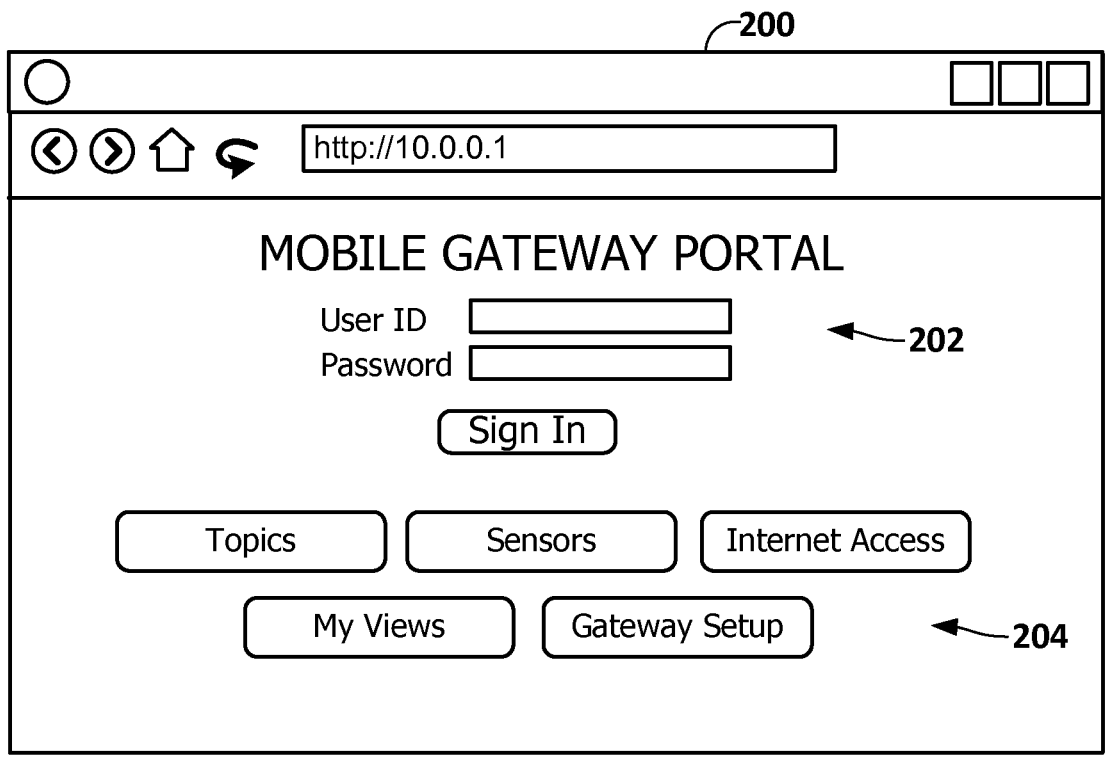
FIGS. 2-5 are user interface diagrams illustrating presentation of data to a user device according to example embodiments.

An example of how a mobile gateway may present data to a browser 200 of user device is shown in FIGS. 2-5. In FIG. 2, the browser 200 shows a portal screen, which may be displayed after establishing a connection to a gateway-integrated wireless network hotspot or other proximity connection. The portal page may include authentication controls 202 that verify credentials in order to access the data. Other means of authentication may be used, including a hardware key (e.g., RFID card) and biometrics (e.g., voice, face, fingerprint). One advantage of using a widely available user device is that a variety of authentication means may be already built in and verified on particular devices.

Content view controls 204 provide access to various types of content from the mobile gateway. The non-exhaustive categories shown include published Topics, Sensors, general-purpose Internet Access, customizable views ("My Views"), and Gateway Setup. Links to these categories may also be seen in the footer of the pages shown in FIGS. 2-5. The Topics categories represents published topics provided by a publish/subscribe component, such as component 124 shown in FIG. 1. The Topics may also include remotely published data, e.g., provided by the Cloud Gateway, that may originate from a centralized entity (e.g., fleet owner) and other vehicles. An example of a Topics view is shown in FIG. 3.

Figure 3:
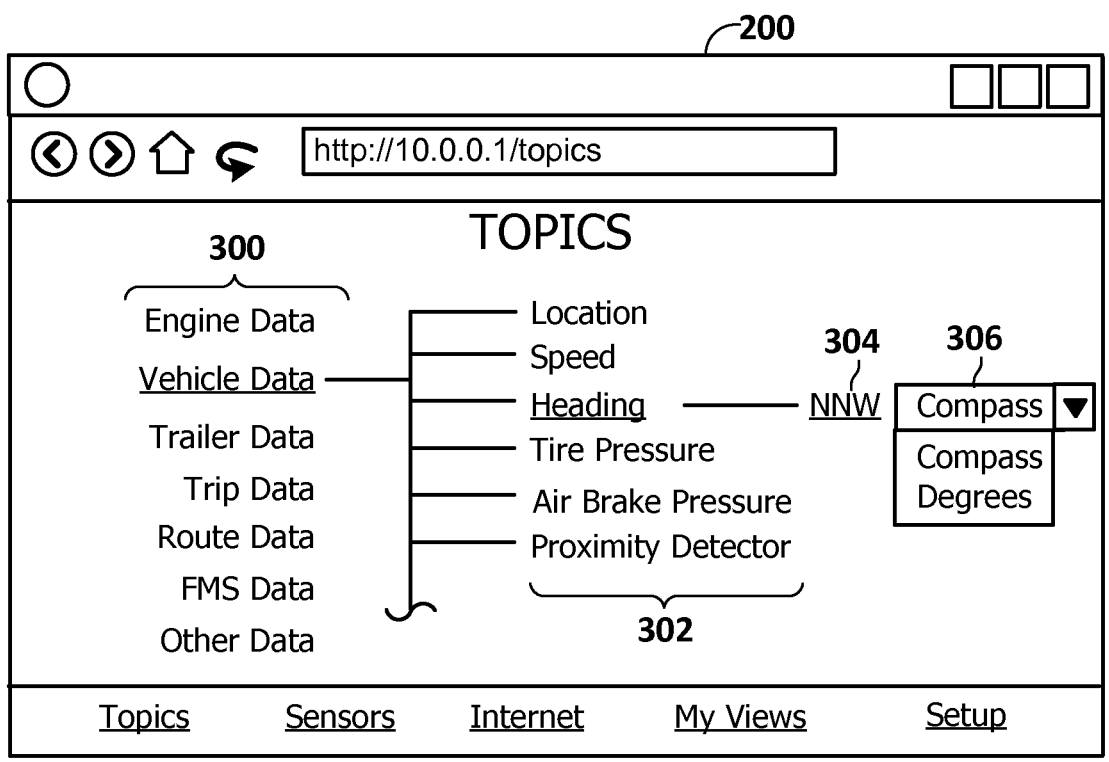

In FIG. 3, the browser 200 displays a hierarchical view of published topics. The first level 300 includes various broad categories such as Engine Data, Vehicle Data (e.g., non-engine sensors on the cab), Trailer Data (e.g., tires, brakes, refrigeration status), Trip Data (e.g., information about the current task, such as destination, origin, payee, tracking numbers, cargo), Route Data (e.g., navigation, traffic, weather), FMS Data (e.g., driver info, dispatch messages), and Other Data. The Vehicle Data control is shown as selected in FIG. 3, which presents a second hierarchal level of subtopics 302. One of the subtopics, Heading, is shown selected, and the heading data 304 is displayed, and can be dynamically updated. The units of display can be changed, as indicated by control 304.

Figure 4:
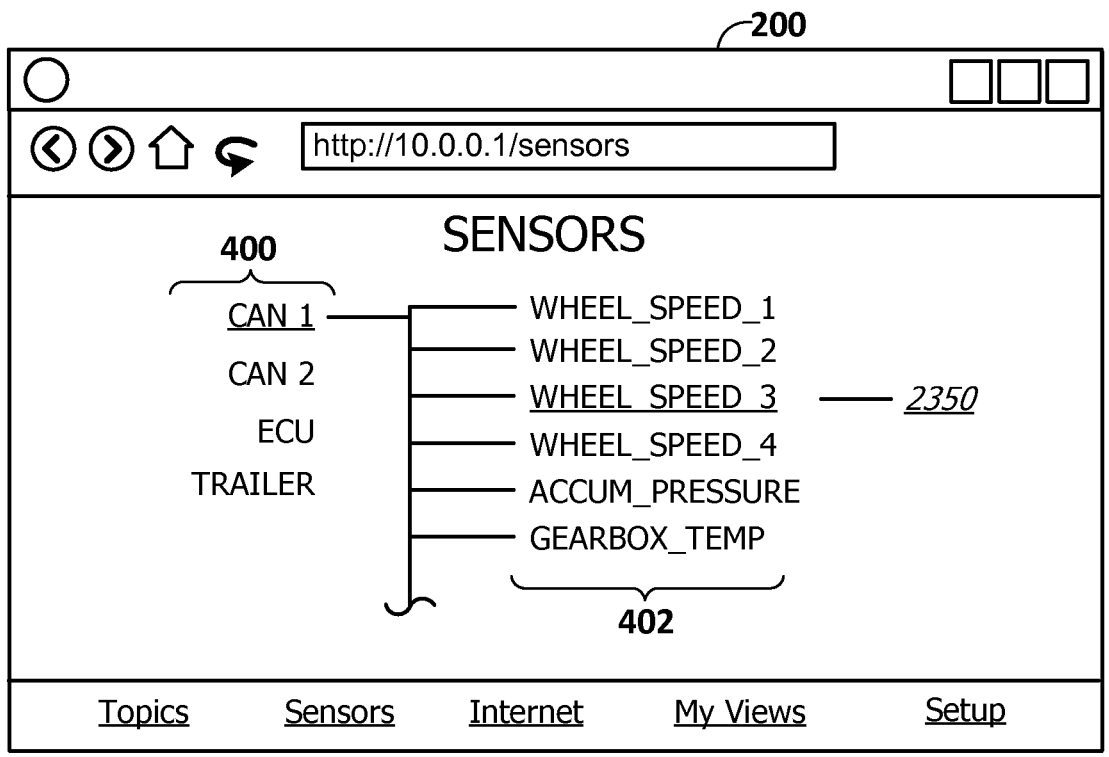

The hierarchical view shown in FIG. 3 is just one example of how vehicle data may be displayed, and other view paradigms may be used. Generally, a hierarchical view allows for browsing through available data sets, and can be easily modified in response to addition and subtraction of sensors as described elsewhere herein. Similarly, the Sensor view, shown in FIG. 4, shows a hierarchical view based on busses 400 and individual sensors 402. The Sensor view may be more useful for uses such as troubleshooting technical problems. For example, in FIG. 4, the raw data from a wheel speed sensor (e.g., as used in anti-lock brake system) is shown. In contrast, the Topics view is more tailored toward end-users such as drivers and fleet managers. In either case, the views presented may be auto-generated based on data sets that are automatically detected, collected, and logged by the mobile gateway.

Figure 5:
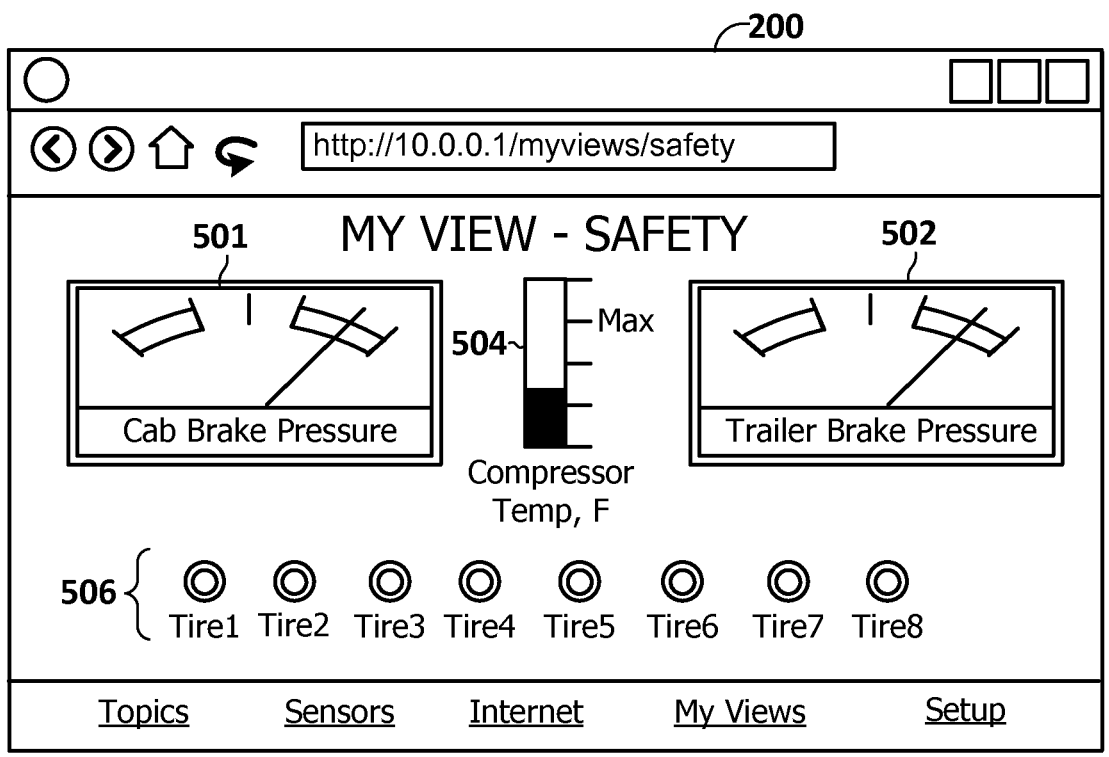

In FIG. 5, a user-customizable view is shown in the browser 200. The mobile gateway may include a tool that allows selecting various data sources (e.g., via the screens shown in FIGS. 3 and 4), associating the data source with a graphical element (e.g., VU-meter, bar meter, indicator light, digital readout, bar graph, pie chart, line graph, etc.). The user can arrange the graphical elements according to their own preferences, and create different view for different purposes (e.g., safety, dispatch, trip progress, traffic, weather, etc.). The illustrated view includes two air brake pressure meters 501-502, an air compressor temperature bar meter 504, and tire status lights 506. The mobile gateway may allow the use to combine different data sources to achieve the desired results. For example, if the cab or trailer tires include an auto-inflation system, then the tire indicators could turn red or yellow if either the pressure is below a threshold or if the auto-inflation systems associated with a group of tires is not working.

Even if a custom view as shown in FIG. 5 is redundant to other indicators available to the driver, the ability to customize the view may be useful. Further, the views may be made available as templates and pushed out to mobile gateways via the cloud gateway. In this way, a commercial fleet may be able to create a custom view tailored for the fleet owning company, including company-specific data, logos, and functionality. Such views may also accept data inputs to facilitate specific business practices of the company. For example, express input of rest times and drive times by the driver into the user device may help lower insurance rates without unduly inconveniencing the drivers, thereby facilitating compliance. Other aspects, such as effective use of gears, fuel efficiency, etc. could be reported in real-time to the driver if such factors, e.g., affect employee reviews or pay. This may help the driver to both better understand the policies and improve aspects of performance that are of interest to the company.

It will be understood that the views shown in FIGS. 3-5 may be user customizable and/or be based on a template that is remotely sent to the mobile gateway. The latter approach facilitates maintaining a common set of views that have been found useful or necessary, e.g., due to risk mitigation, regulation, etc. Such templates may take the form of a markup language content page with special tags that can be filled in by a server-side component at run time. For example, technologies such as PHP, Java Server Faces, Rails, etc., allow defining layout and appearance of content via template pages. The template pages include placeholders where dynamically generated content can be inserted, in this case text or images based on sensor data.

Figure 6:
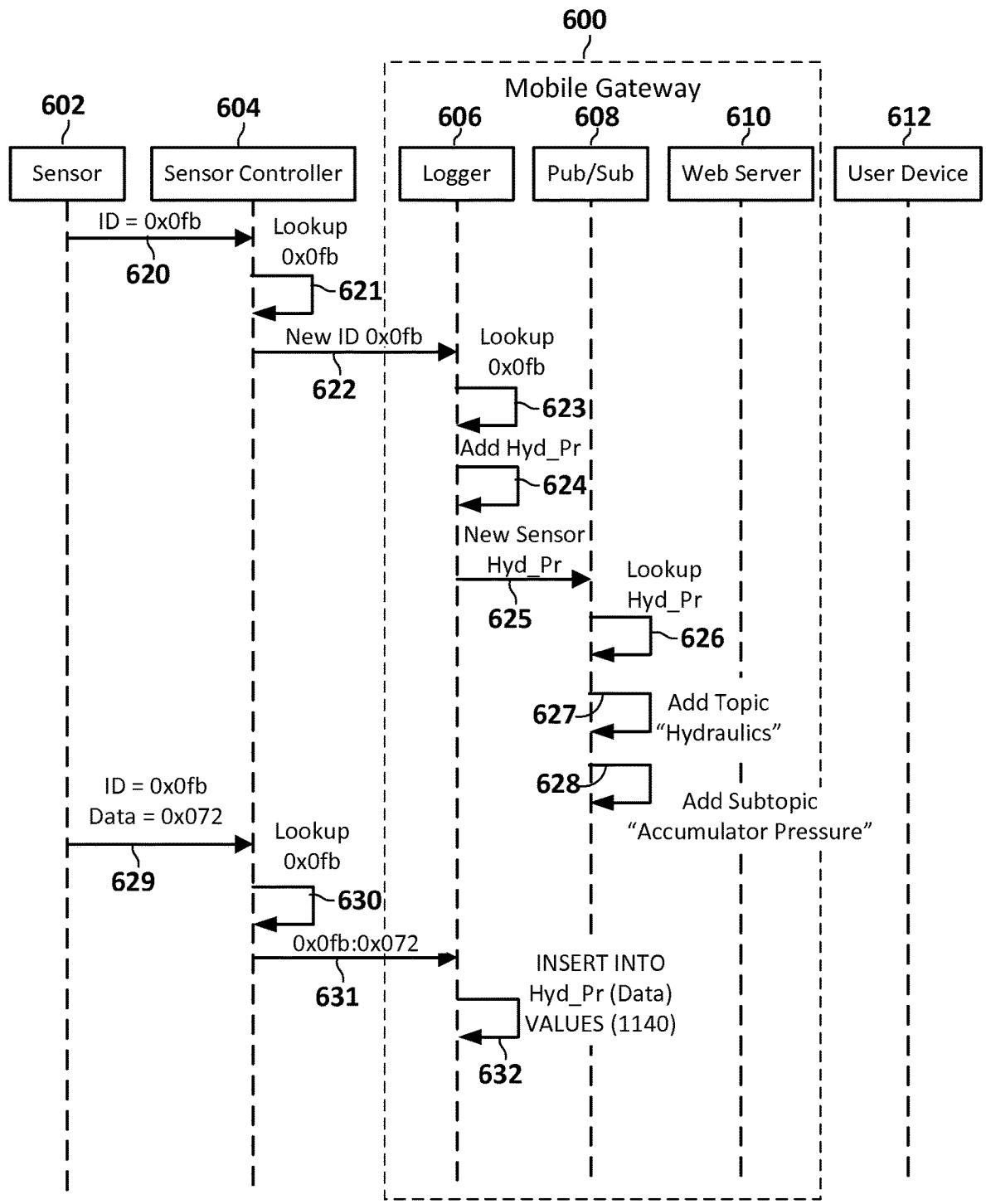
FIGS. 6-7 are sequence diagrams illustrating operation of an in-vehicle system according to example embodiments.

In FIG. 6, a sequence diagram shows an example of how a newly added sensor 602 can be detected and added to the available data provided by a mobile gateway 600. The sensor 602 is coupled to a sensor controller 604 that inputs data to a logger 606 of the mobile gateway 600. The logger 606 coordinates with a publication/subscription interface 608, which coordinates with a web server 610. A user device 612 interacts with the web server 610 as is known in the art. In this example, the sensor 602 sends an initial message 620 to the sensor controller 604, e.g., after system initialization. The message 620 may include data, but for purposes of this example only shows a unique, numeric identifier of the sensor 602.

The sensor controller 604 may perform a lookup 621 for every message it receives, as all the messages may come over the same channel of the sensor bus. In this case, this is the first time this message identifier is detected, and so the new identifier is signaled 622 to the logger 606. The logger 606 in this example performs its own lookup 623, e.g., via a local or remote database. Such databases may be available for certain classes of devices, such as CAN sensors, network devices, peripheral bus devices, etc. The data obtained may at least indicate the type of device (e.g., temperature sensor, pressure sensor, etc.) and may include other data, such as part number, manufacturer, revision number, etc.

In this example, the lookup 623 determines that the numeric identifier is for a hydraulic pressure sensor, and this more detailed information (e.g., in the form of text and/or other structured data) is added 624 to a local database. For example, a new table Hyd_Pr may be created as part of the addition 624, with columns such as timestamp and numeric data value. Other information, such as how to interpret binary sensor data may also be determined at this level, or such information may be determined upstream via publication/subscription interface 608.

The addition of the new sensor 602 by the logger 606 is also signaled 625 to the publication/subscription interface 608. This may cause the publication/subscription interface 608 to perform its own lookup 626. In this example, the general hardware details (e.g., type of sensor detected) are managed by the logger 606, while application details (e.g., in which vehicle system the sensor 602 is used) may be determined by the publication/subscription interface 608. For example, the hydraulic sensor 602 may be used for a number of systems, such as brakes, power take-off, suspension leveling, etc. A fleet management system may have the knowledge of the particular context in which this sensor 602 is being used, and can push that data out to the publication/subscription interface 608.

Based on application-level information determined from the lookup 626, the publication/subscription interface 608 adds 626 a topic (or updates and existing topic) called "Hydraulics," and adds 628 (or updates) a topic "Accumulator Pressure" under which the sensor data is published. Thereafter, when sensor data 629 is received, the sensor controller 604 performs another lookup 630. This lookup 630 determines this is a known sensor identifier, and so passes the data 631 to the logger 606. In this example, the logger 606 logs the data via a Structured Query Language (SQL) insert statement. Note that the sensor data value 0x072 is converted to base 10 value of 114 and multiplied by 10, which represents 1140 pounds per square inch. Also note that, while not shown, other data may be inserted with the sensor data, such as a timestamp. This other data may also include the numeric sensor identifier, should multiple equivalent sensors be used to populate the same table. The logger 606 may inform the publication/subscription interface 608 of each new insertion, or the publication/subscription interface 608 may perform its own polling of incoming data, e.g., based on a particular publication schedule.

Figure 7:
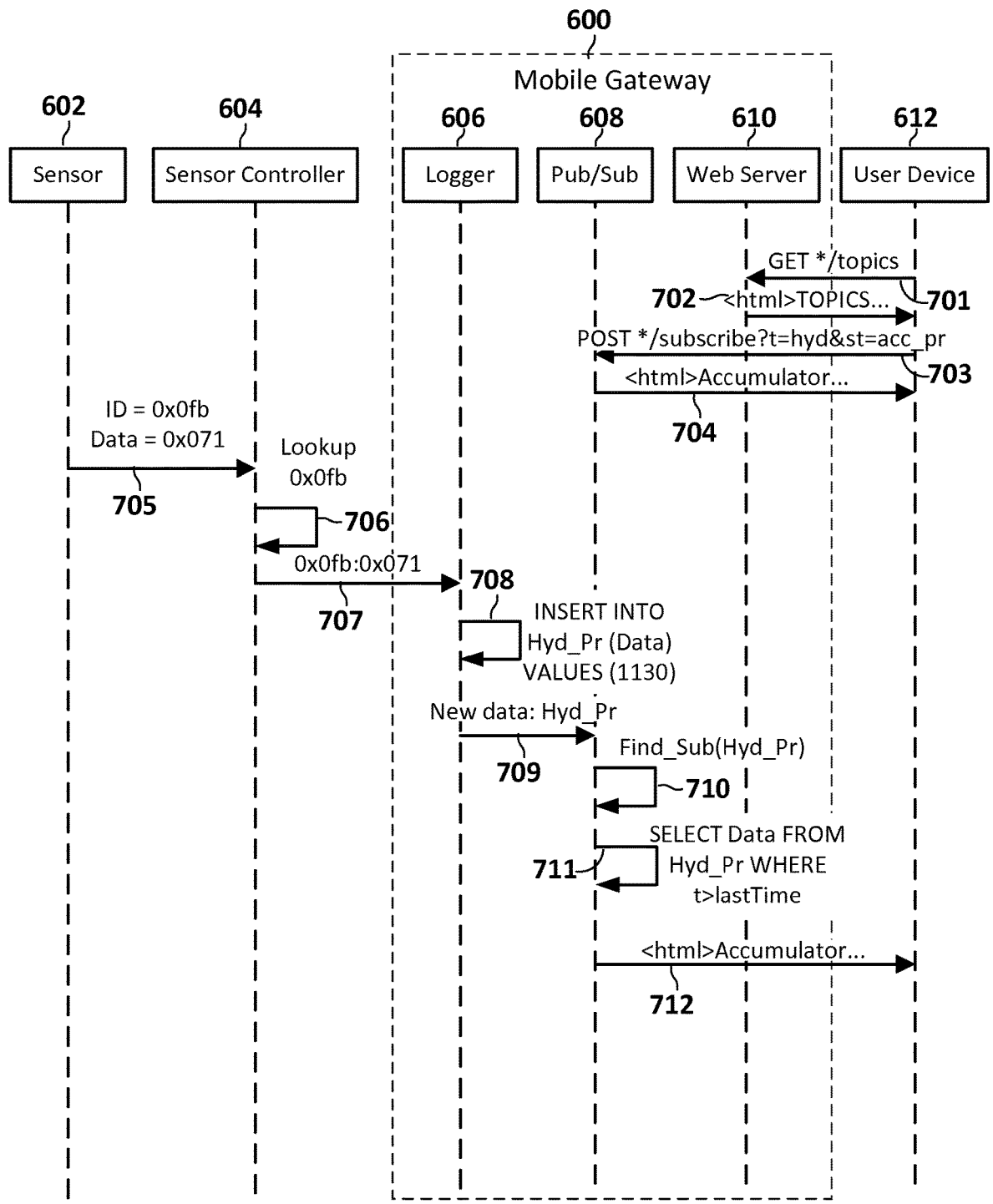

In FIG. 7, another example sequence is shown that follows that of FIG. 6. The user device 612 requests 701 a list of published topics, e.g., via an HTTP GET. The result 702 is returned in the form of a tagged/structured document, e.g., Hypertext Markup Language (HTML), eXtensible Markup Language (XML), JavaScript™ Object Notation (JSON), etc. In response, e.g., to a user selection via the user device 612, an HTTP POST command 703 causes the browser session to subscribe to the previously created topic and sub-topic of the accumulator data. This has the effect of adding a subscriber to this data at the publication/subscription interface 608, and causing a content page 704 to be returned. An initial value of the pressure may first be looked up before returning the content page 704, although is not shown here.

Thereafter, the sensor 602, sensor controller 604, and logger 606 receive and log new data via actions 705-708. In this example, the newly added data is signaled 709 to the publication/subscription interface 608. As described above, the publication/subscription interface 608 may have other ways of detecting new data, e.g., polling, detecting inserts into the database, etc. In response to the signal 709, the publication/subscription interface 608 determines 710 all subscribers for the data, of which at least the user device 612 is found. The latest data is selected 711 (e.g., via SQL query, although the signal 709 may have all the needed data) and used to form an updated document 712 that is sent to the user device 612. Other, more efficient, mechanisms may be used to update the browser on the user device 612, such as Asynchronous JavaScript and XML (AJAX), which allows asynchronously updating the displayed sensor data without reloading the page.

Figure 8:
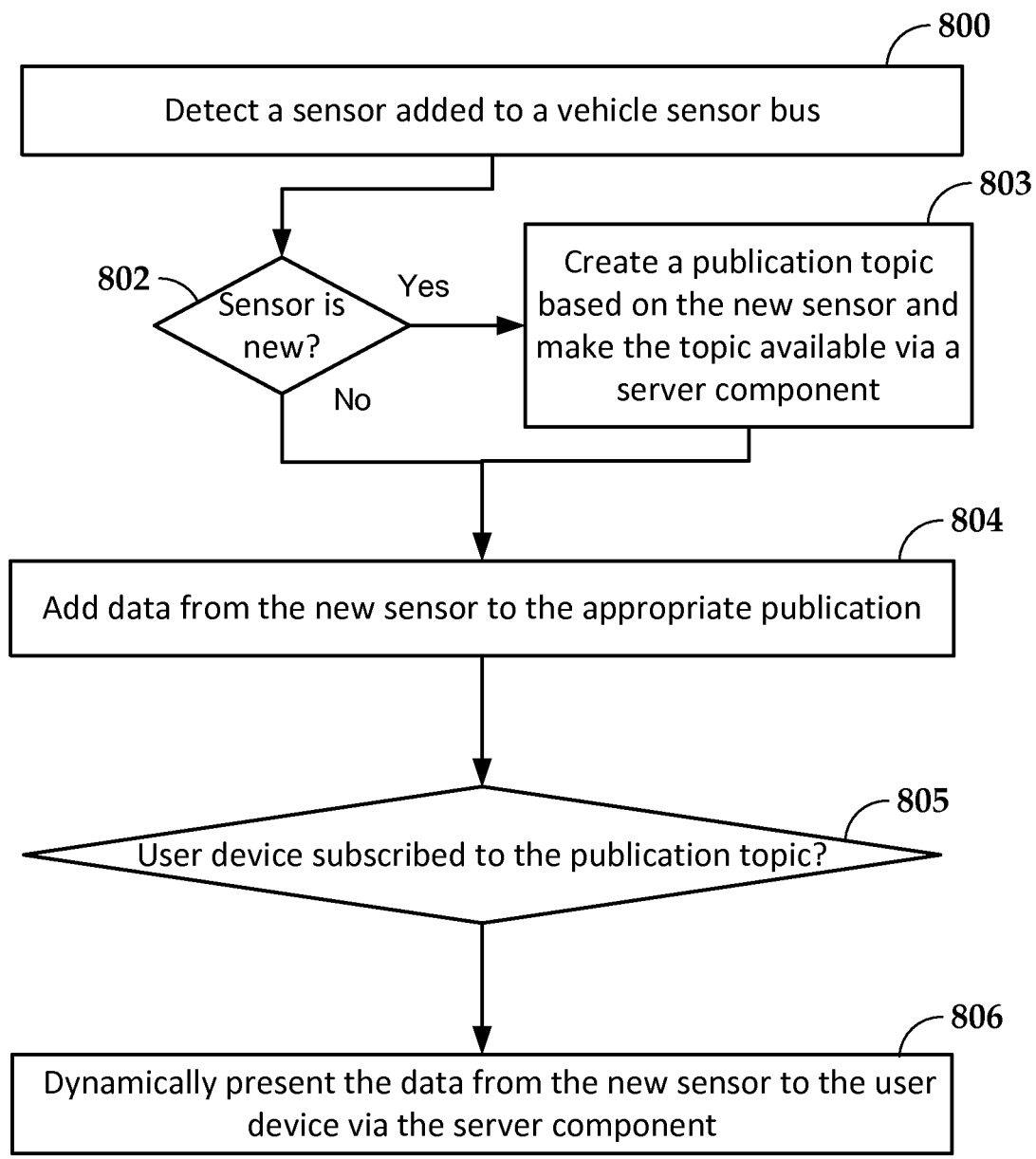
FIG. 8 is a flowchart illustrating a method according to an example embodiment.

In reference now to FIG. 8, a flowchart shows a method according to an example embodiment. The method involves detecting 800 a sensor added to a vehicle sensor bus. A check is made to determine 802 if the sensor is a new sensor (i.e., not previously used on the vehicle sensor bus). If so, a publication topic is created 803 based on the new sensor and the topic is made available via a server component. The method also involves adding 804 data from the new sensor to the appropriate publication. If a user device has subscribed 805 to the publication topic, the data from the new sensor is dynamically presented 806 to the user device via the server component.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts or other diagrams presented herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A mobile gateway comprising:
   a sensor interface configured to communicate via a vehicle sensor bus;
   a proximity networking radio configured to communicate with a user device via a proximity network;
   a radio module configured to communicate with an Internet-connected, cloud gateway;
   a sensor logging component;
   a publish/subscribe interface; and
   a processor coupled to the sensor interface, the proximity networking radio, the radio module, the sensor logging component, and the publish/subscribe interface;
   wherein the sensor interface, the proximity networking radio, the radio module, the sensor logging component, the publish/subscribe interface, and the processor are integrated in the mobile gateway located on a motor vehicle and are configured to operate on the motor vehicle;
   wherein the processor is configured to:
      detect a new sensor added to the vehicle sensor bus via the sensor logging component;
      determine, via the publish/subscribe interface of the mobile gateway via accessing the cloud gateway, a context in which the sensor is being used;
      create a publication topic based on the new sensor and the context, the publication topic made available via the publish/subscribe interface that is further accessible via the proximity networking radio;
      add sensor data from the new sensor to the publication topic via the sensor logging component;
      in response to creation of the publication topic via the publish/subscribe interface, receive a template from the cloud gateway that defines a view of the sensor data; and
      in response to a subscription to the publication topic via the user device, dynamically present the sensor data to a web browser of the user device via a web server using the template to define a web page used to view of the sensor data on the user device.

2. The mobile gateway of claim 1, wherein the sensor bus comprises a controller area network bus.

3. The mobile gateway of claim 1, wherein the publish/subscribe interface-comprises an HTTP server.

4. The mobile gateway of claim 1, wherein the proximity network comprises a wireless network.

5. The mobile gateway of claim 1, wherein the processor is further configured to:
   determine a numerical identifier of the new sensor; and
   based on the numerical identifier, determine at least a type of the new sensor.

6. The mobile gateway of claim 5, wherein the publication topic is based on the type of the new sensor.

7. The mobile gateway of claim 1, wherein the processor is further configured to:
   determine a user selection of multiple topics via the user device and the web server; and
   dynamically present sensor data from the multiple topics via the web server.

8. The mobile gateway of claim 1, wherein the processor is further configured to:
   receive a second subscription to the publication topic via the cloud gateway; and
   in response to the second subscription, dynamically send the sensor data to the cloud gateway.

9. The mobile gateway of claim 1, wherein the processor is further configured to:
   create another publication topic based on user data created at the user device and present the other publication topic via the publish/subscribe interface;
   receive the user data from the user device via the sensor logging component; and
   in response to a subscription of the other publication topic via the cloud gateway, provide the user data to the cloud gateway.

10. The mobile gateway of claim 1, wherein the processor is further configured to:
    determine, via the publish/subscribe interface, the context in which the sensor is being used by determining, via the publish/subscribe interface, a vehicle subsystem in which the sensor is configured to operate.

11. The mobile gateway of claim 1, wherein the processor is further configured to:
    determine, via the sensor logging component, a type of the detected new sensor.

12. The mobile gateway of claim 11, wherein the publication topic is created, via the publish/subscribe interface, based at least on the type of the detected new sensor determined via the sensor logging component.

13. The mobile gateway of claim 1, wherein the processor is further configured to:

authenticate a user's access to the sensor data using at least one of a hardware key or biometrics information of the user received from the user device.

14. The mobile gateway of claim 1, wherein the processor is further configured to:
compress, via the sensor logging component, new sensor data for storage; and
discard, via the sensor logging component, prior sensor data.

15. The mobile gateway of claim 9, wherein the user data received from the user device comprises input by a vehicle operator indicating at least one of rest or operating times.

16. A method comprising:
detecting a new sensor added to a vehicle sensor bus via a sensor logging component of a mobile gateway;
determining, via an Internet-connected, cloud gateway coupled to a publish/subscribe interface of the mobile gateway, a context in which the sensor is being used;
creating a publication topic based on the new sensor and the context, the publication topic made available via at least a the publish/subscribe interface of the mobile gateway operating via a proximity network and the cloud gateway;
adding sensor data from the new sensor to the publication topic;
in response to creation of the publication topic via the publish/subscribe interface, receiving a template from the cloud gateway that defines a view of the sensor data;
publishing the publication topic for subsequent subscription by a user via a user device that is coupled to the mobile gateway via the proximity network;
receiving a subscription to the published publication topic from the user via the user device; and
in response to the subscription to the publication topic via the user device, dynamically presenting the data to a web browser of the user device via a server component using the template to define a web page used to view the sensor data on the user device.

17. The method of claim 16, further comprising:
determining a numerical identifier of the new sensor; and
based on the numerical identifier, determining at least a type of the new sensor.

18. The method of claim 17, wherein the publication topic is based on the type of the new sensor.

19. The method of claim 16, further comprising:
determining user selection of multiple topics via the user device and the server component; and
dynamically presenting data from the multiple topics via the server component.

20. The method of claim 16, further comprising:
creating another publication topic based on user data created at the user device and present the other publication topic via the publish/subscribe interface;
receiving the user data from the user device via the sensor logging component; and
in response to a subscription of the other publication topic via the cloud gateway, providing the user data to the cloud gateway.

* * * * *